United States Patent

Hirabayashi et al.

Patent Number: 6,021,209
Date of Patent: Feb. 1, 2000

[54] DISTANCE DETECTION METHOD USING IMAGES

[75] Inventors: Takehide Hirabayashi; Hideo Shimizu, both of Tokyo; Akio Izumi, Nagano, all of Japan

[73] Assignee: Fuji Electric Co., Ltd., Kawasaki, Japan

[21] Appl. No.: 08/901,066

[22] Filed: Jul. 28, 1997

[30] Foreign Application Priority Data

Aug. 6, 1996 [JP] Japan .................................. 8-206687

[51] Int. Cl.[7] .......................... G06K 9/00; G08G 1/017; G01C 3/00; H04N 7/00

[52] U.S. Cl. .......................... 382/103; 382/104; 382/106; 382/278; 340/937; 356/3.14; 348/116; 348/140; 348/170

[58] Field of Search .................. 382/104, 103, 382/106, 278; 340/937; 356/3.14; 348/113, 116, 135, 140, 170

[56] References Cited

U.S. PATENT DOCUMENTS

| | | | |
|---|---|---|---|
| 4,561,749 | 12/1985 | Utagawa | 354/406 |
| 4,969,036 | 11/1990 | Bhanu et al. | 348/113 |
| 5,113,215 | 5/1992 | Nishibe | 354/408 |
| 5,357,310 | 10/1994 | Kawamura et al. | 354/408 |
| 5,422,828 | 6/1995 | Choate et al. | 364/516 |
| 5,557,323 | 9/1996 | Kajiwara | 348/140 |
| 5,568,249 | 10/1996 | Kawamura et al. | 356/3.14 |
| 5,602,944 | 2/1997 | Yokoyama et al. | 382/278 |
| 5,612,763 | 3/1997 | Uchiyama | 396/126 |
| 5,619,301 | 4/1997 | Suzuki et al. | 396/114 |
| 5,642,299 | 6/1997 | Hardin et al. | 364/561 |

*Primary Examiner*—Amelia Au
*Assistant Examiner*—Mehrdad Dastouri
*Attorney, Agent, or Firm*—Kanesaka & Takeuchi

[57] ABSTRACT

In a distance detection method, a pair of image data representing a pattern of images is obtained by using a pair of image sensors for receiving optical images. Then, a detection target extracted from each of the image data is captured while sequentially shifting positions of divisions in respective groups of divisions from window part data corresponding to a visual field to provide combinations, each having a pair of divisions, and a correlation value is calculated between each pair of the divisions. Also, a precision at a best correlation point as an indicator of reliability of the best correlation is obtained based on a changing condition of the correlation value near a shift value where the best correlation value has been calculated. Finally, a distance to the detection target is obtained by determining that the detection target is present in the visual field seen through the window corresponding to the window part data only when the precision exceeds a predetermined level.

5 Claims, 5 Drawing Sheets

DISTANCE DETECTION METHOD USING IMAGES

BACKGROUND OF THE INVENTION AND RELATED ART STATEMENT

The present invention relates to a passive distance detection method that captures a target, such as a preceding car, from images received from image sensors and calculates the distance in order to avert collision.

The above passive distance detection method uses a pair of image sensors disposed horizontally, vertically or diagonally to capture two images of a distant object. Parallax between the two images is used to calculate the distance from the object. Compared to an active method which irradiates supersonic waves or light to a distant object to detect the distance by the reflection time, the passive method is more accurate, more suitable for long-distance detection, and is better in distinguishing the target from a background. The passive method is already in use in autofocus cameras, and is foreseen as particularly suitable for use in devices to prevent collision of an automobile.

Distance detection using parallax is based on the principle of triangulation. In case an optical system with a pair of lenses is used to obtain an image of a target on a pair of image sensors via different optical paths, and in case an offset σ from a reference position is detected when the target at the image formation position is located at a point at infinity, a distance (d) can be calculated by using the following expression when the distance between the lenses and the focal distance of the lenses, which are the base lengths of triangulation, are referred to as (b) and (f), respectively:

$$d=bf/\sigma$$

In practice, the offset σ is used as the indicator instead of distance (d).

In using an autofocus camera, the user uses a viewfinder to choose the target to which the distance is to be calculated. In a collision prevention device, however, it is impossible to force the driver to identify a target located directly or diagonally in front of the car, so a relatively larger visual field must be set for the image sensors to automatically detect unspecified targets and to calculate their distances.

Fortunately, as is well known, even when the detection target is located diagonally in front of the car at an angle θ from the front surface of the image sensors, distance (d) can be determined with the above equation regardless of the angle θ by detecting the offset σ from a reference position when the target at the image formation position in the image is located at a point at infinity in the direction of an angle θ. Thus, the problem lies in detecting the target in the visual field.

In one proposed method, the visual field is subdivided into a number of narrower sub-visual fields, and the distances are calculated for each sub-visual field, with selection of the detected distance that is seemingly the most accurate based on the frequency distribution of the detected distances (referred to as a method A for the convenience of explanation). In another method, each sub-visual field within the visual field of the image sensor is sequentially scanned to determine the correlation between the pair of images for each sub-visual field, and it is determined that the target is present in the scanning range for which a good correlation has been found, and the distance of the target from the sensors is detected (referred to as a method B).

Objects other than the target, however, are found in the visual field of the image sensors used to find the target and to detect the distance to the target. Thus, errors may occur in detecting the distance for each sub-visual field that will hamper obtaining the good correlation in examination of image pairs for each sub-visual field.

The distance to the object present in the visual field is often different from the distance to the target to be detected, so that there is an advantage in distinguishing the target from other objects.

If, however, there is an object different in distance from the target in same visual field and for which there exists parallax between the pair of the image sensors, a good correlation between the pair of the images can not be obtained, resulting in an inaccurate distance detection.

This is briefly described with reference to FIG. 3. The image in the visual field by a plurality of pairs of the image sensors shown in the frame of the figure includes a detection target 1 (preceding car), background and scenery including a road RD, a guard rail GR, a road sign RS, another car Au, trees Tr, posts Ps, and a mountain Mt as well as the shadow Sh of the target 1 on the road RD. A sub-visual field that captures the target 1 in this visual field is usually set as a part of the visual field for each pair of the image sensors, and several examples of such sub-visual fields are shown as rectangles. In the figure, sub-visual fields S1 to S3 correspond to the cases where the pairs of the image sensors are disposed vertically, while sub-visual fields S4 and S5 are arranged horizontally, respectively.

S1 is an ideal visual field set to contain the overall target 1 with few extraneous images. Thus, in this sub-visual field, the method A can accurately detect the distance, while the method B provides good correlation. A sub-visual field S2 captures a part of the target 1 but contains images of the on-coming car Au and mountain Mt located away from the image sensors. Therefore, the method A is likely to detect the distances to these remote objects. Since the method B determines correlation with the assumption of a certain distance, good correlation can be obtained if the assumed distance is close to the actual distance from the target 1, but the correlation is poor if the assumption is incorrect. The sub-visual field S3 captures a part of the target 1 and its shadow Sh. Contrast with the shadow is very high, so the method A is more likely to detect the distance from the shadow Sh rather than from the target 1, while the method B provides a degraded correlation even if the assumption is sufficiently accurate.

The sub-visual field S4 captures the most of the target 1, but a distinctive image pattern is insufficient for images of a road RD and a guard rail GR mixed therein. Thus, the method A is likely to provide incorrect distances caused by the mixed images, while the method B provides a low correlation value even if the assumption is correct. The sub-visual field S5 captures the most of the distinctive pattern of the target 1. Thus, although images of trees Tr and posts Ps are mixed in the visual field, the method A can accurately detect the distances as long as these images are near the target 1. In the method B, if a distance is correctly assumed, though the target is not correctly captured, a good correlation is obtained. But, the correct detection where the target 1 is present can not be detected.

As is apparent from these examples, if a direction and a size of the target in the visual field can be set to correctly capture the same, its distance and presence can be accurately detected. If they are set to allow the mixture of the images of extraneous objects, particularly those at different distances from the image sensors, the distance and direction of the target are not accurately determined. However, the distance and direction of the target are actually determined based on the perception results that may contain errors, since it is difficult to determine whether the detection results are accurate. Particularly for preventing collisions, automatic correct target capture is necessary to calculate the distance and direction without a burden to a driver to identify the target.

Therefore, an object of the invention is to provide a distance detection method, wherein a target distance and presence can be determined based only on truly reliable results by assessing reliability of the detection results of the target.

SUMMARY OF THE INVENTION

The distance detection method used in this invention uses a pair of image sensors that receive optical images via different optical paths, in order to provide a pair of image data representing image patterns; correlation value calculation means to capture the detection target extracted from each image while sequentially shifting positions of groups of divisions from window part data corresponding to a visual field, to provide combinations, each being formed of a pair of the divisions, and to calculate a correlation value between the pair of the divisions; and reliability test means to determine precision of a best correlation point to indicate reliability of the best correlation based on a condition of changes in the correlation value near the shift value of the divisions at which the best correlation value has been calculated. The distance is detected based on the determination that the detection target is present in the visual field seen through the window corresponding to the window part data only when the precision is higher than a predetermined level.

As is apparent from the above structure, the size and direction of the visual field that captures the target are set by the number of window part data and the extraction positions from which the image data is continuously extracted. That is, the target is captured in the visual field seen through the window corresponding to the window part data.

In detecting the distance to the target, this invention calculates a correlation value for a combination of the divisions according to the above structure by the correlation value calculation means and determines the distance from the shift value of the positions from which the divisions corresponding to the best correlation are extracted from the data in the window part. If other objects at different distances share the visual field, the dependency on the shift values of the correlation values near the optimal value changes to reduce the precision of the best correlation point. This invention uses the reliability test means according to the above structure to calculate precision from the condition of change in the correlation values near the shift value corresponding to the best correlation point in order to use the precision as an indicator for evaluating the reliability of the best correlation, and determines that the best correlation is reliable only when it is higher than a specified level, in order to detect the distance to the target from the corresponding shift value.

The precision as a reliability indicator is preferably the average of slopes of a plurality of, for example, two correlation values before and after the best correlation point or a gentler slope on either side of the best correlation point. In the latter case, a reasonable correction is made to allow the average of the slopes to approach the value of the gentler slope.

However, since the precision is likely to increase with increasing contrast for an image in the visual field, an effective precision that has been corrected by using the contrast value of the image can reasonably be used as a measure for evaluating the reliability. It is convenient that the contrast value is the sum of the absolute values of differential values for internal data numbers in the window part data that indicates the images in the visual field, and the average of the effective precision obtained from each pair of the window part data is preferably determined to use the measure more accurately. The differential values of the window part data used to calculate contrast values are useful as the basis for calculation of the correlation values, and calculations can be executed more easily to obtain good results when correlation values are calculated by the correlation value calculation means based on the differential data rather than the window part data.

Figure 3:
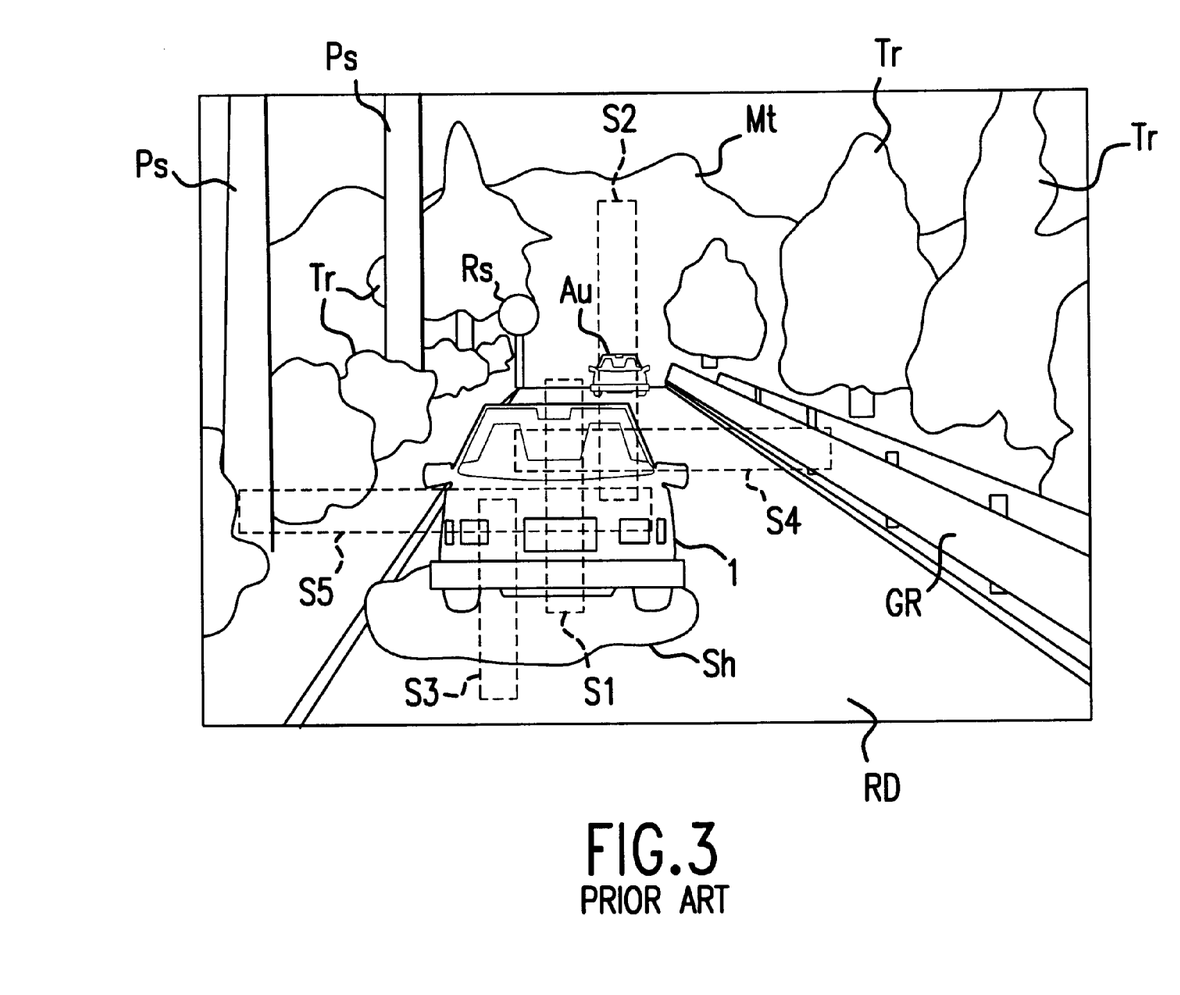
FIG. 3 is a sketch showing an example of the visual field of a plurality of pairs of image sensors and sub-visual fields set within the visual field in order to describe an object of this invention.

As seen in the example in FIG. 3, the reliable detection results depend on the visual field set to capture the target as appropriately as possible. Thus, the reliable detection results obtained by the present method should be used in specifying the visual field. To do this, a visual field designating means for specifying the direction and size of the visual field in which the target is to be captured should accompany the correlation value calculation means in order to extract from the image data, and the window part data corresponding to the visual field considered most suitable in capturing the target in view of the detection results is used as the basis for calculating the correlation values.

DETAILED DESCRIPTION OF PREFERRED EMBODIMENT

Figure 1A:
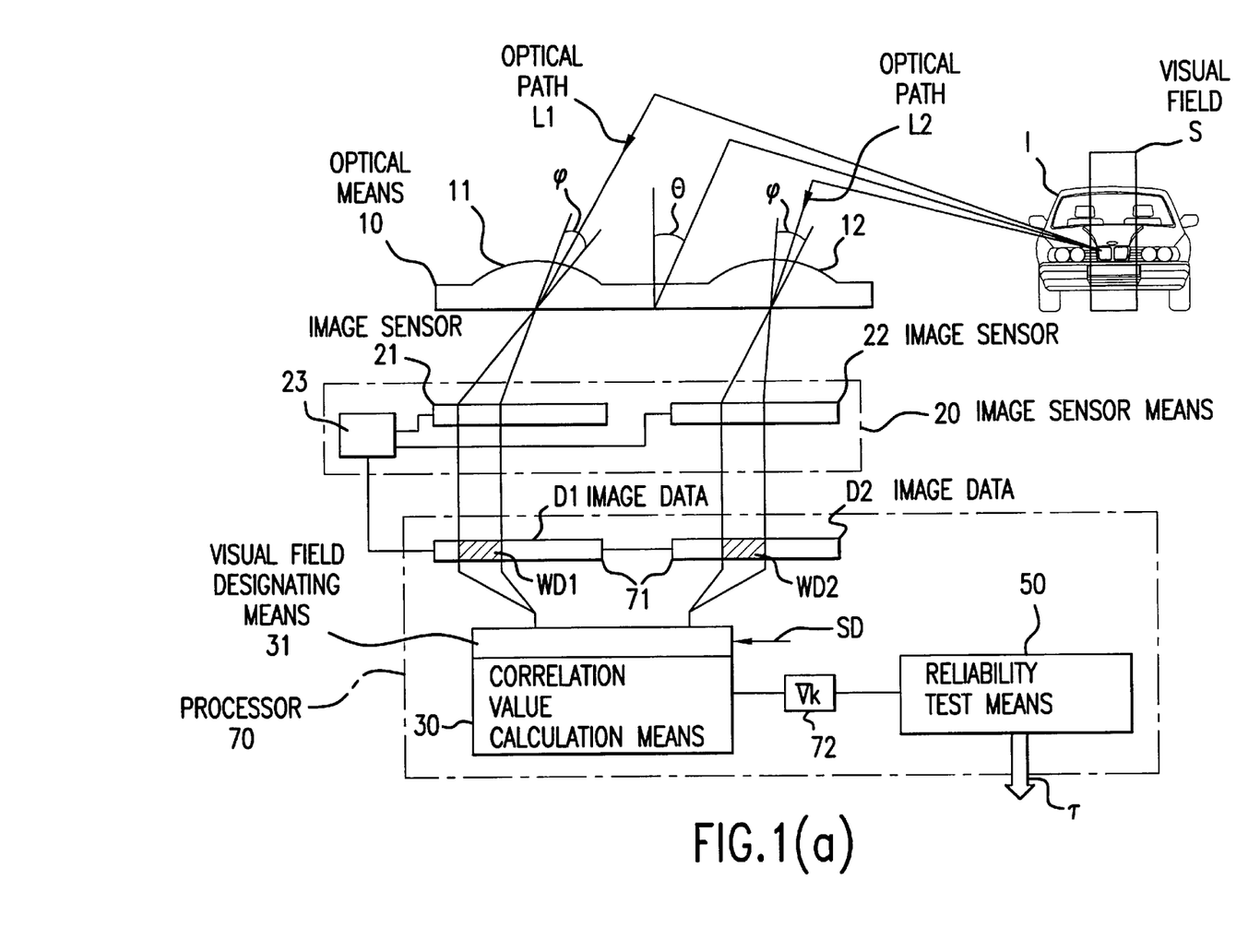
FIG. 1(a) is a block diagram showing an example of the method of the invention together with a target.
Figure 1B:
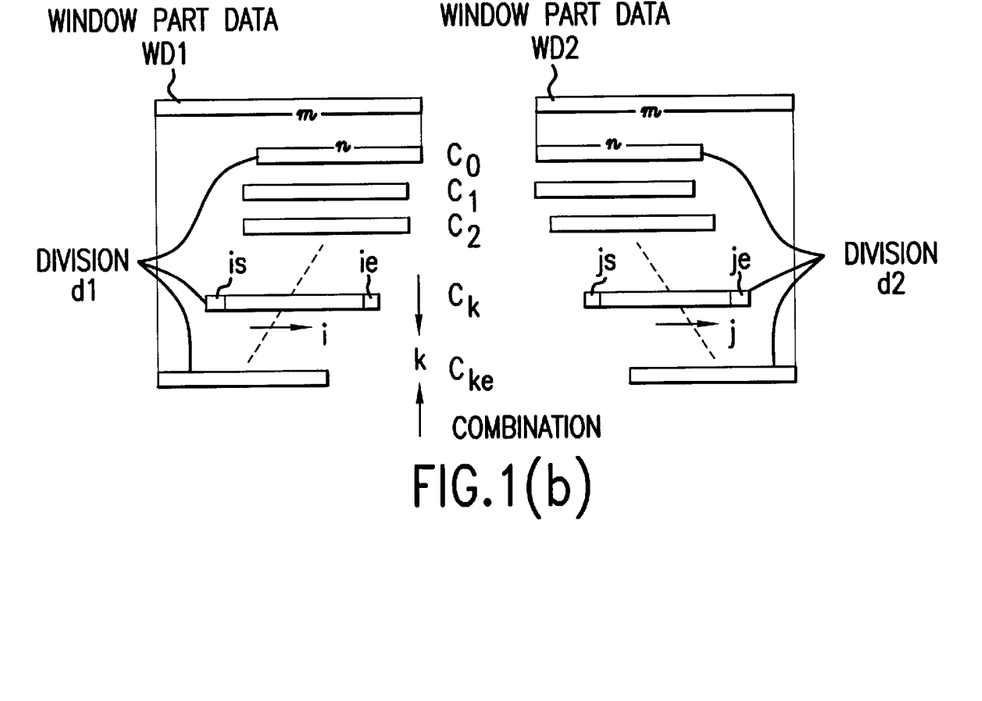
FIG. 1(b) is an image drawing showing window part data and groups of divisions to illustrate a correlation value calculation means.
Figure 1C:
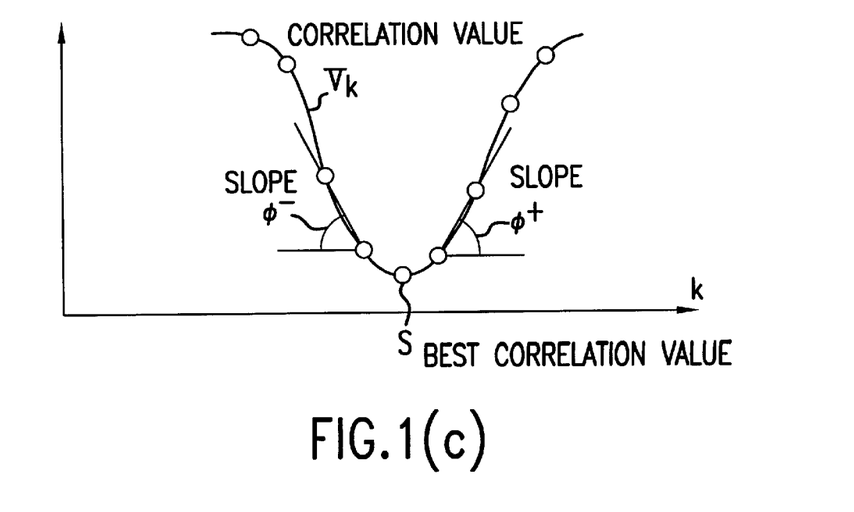
FIG. 1(c) is a diagram showing the condition of changes in a correlation value relative to the combination number of divisions.
Figure 2A:
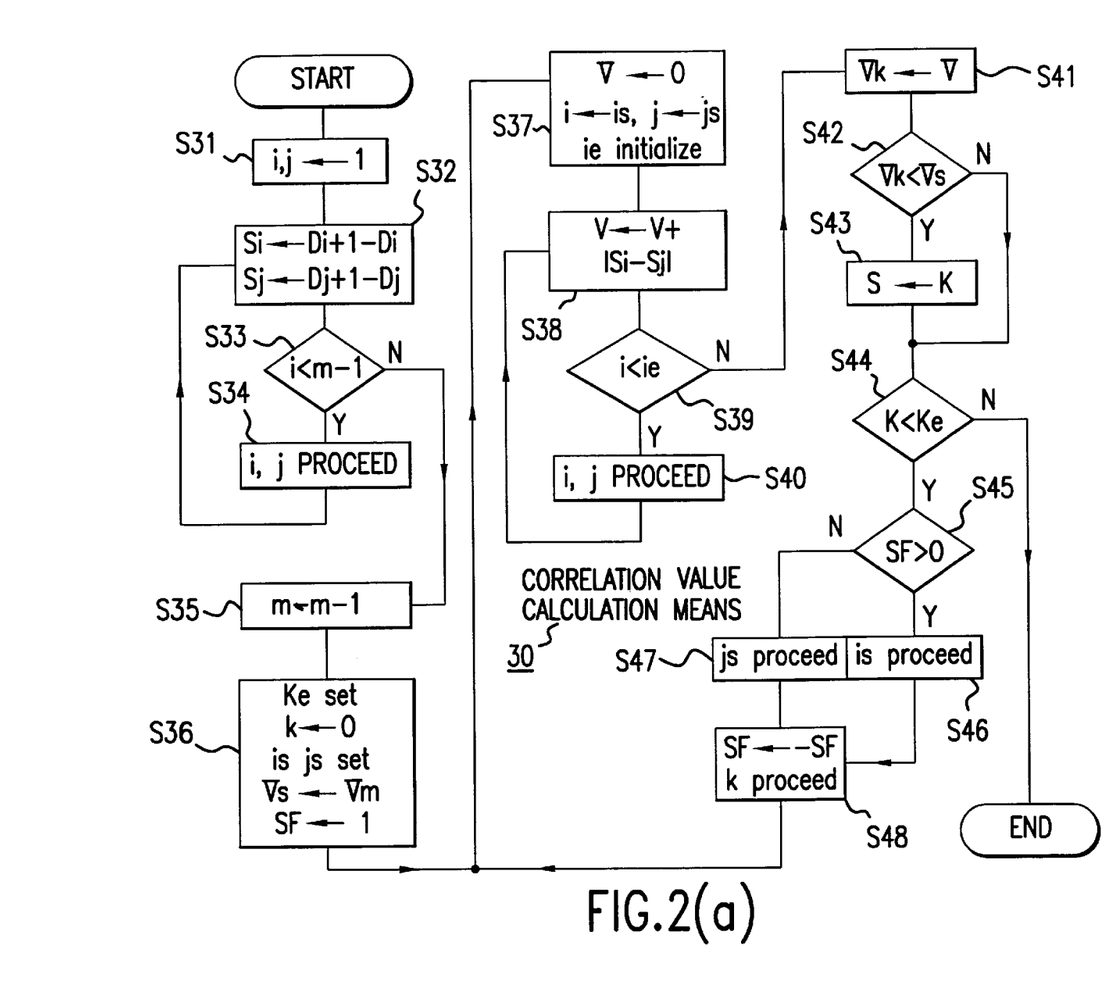
FIG. 2(a) is a flow chart showing an example of the correlation value calculation means.
Figure 2B:
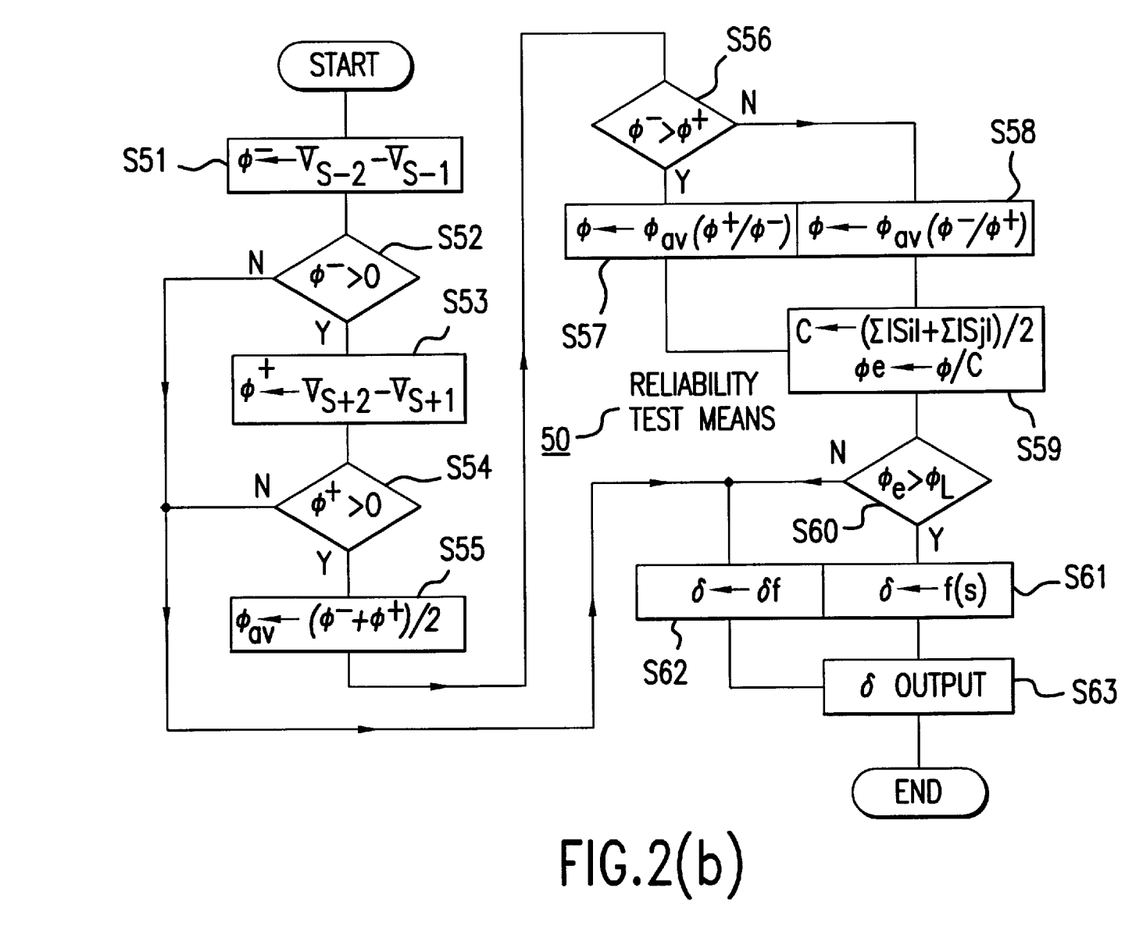
FIG. 2(b) is a flow chart showing an example of a reliability test means.

The preferred embodiment of the invention is described below with reference to the drawings. FIGS. 1(a) to 1(c) show a structure of various methods used in the present embodiment and includes drawings and diagrams that describe the operation. FIGS. 2(a) and 2(b) are flow charts providing examples of the operation of a correlation value calculation and a reliability test method operated by using a software.

Optical means 10 and image sensor means 20 shown in the upper part of FIG. 1(a) are used to capture a target 1 in a visual field S, for example an automobile shown at the right of the optical means 10, and a pair of lenses 11 and 12 of the optical means 10 forms an image including the target 1 in the visual field S on a pair of image sensors 21 and 22 in image sensor means 20 via optical paths L1 and L2, which are indicated by bent lines in the figure. This embodiment actually arranges the pair of lenses 11 and 12 and the pair of image sensors 21 and 22 in a vertical direction for forming the visual field S vertically as shown in the figure, but they are disposed horizontally for the sake of illustration. To capture the target 1 correctly, the visual field S must be positioned at an angle θ with the front surface of the optical means 10, as shown in the figure.

A signal processing and conversion circuit 23 is incorporated in the image sensor means 20. The signal processing and conversion circuit 23 sequentially receives and amplifies sensor signals outputted as analog signals from each of the optical sensors in the image sensors 21 and 22 including, for example CCDs, and converts the signals into digital signals, which are then outputted as sensor data. The signal processing and conversion circuit 23 may be provided for each image sensor 21 or 22.

A processor 70 sequentially receives the sensor data in memories 71, where the data is stored as image data D1 and D2 representing a pattern of the images within the visual field provided by the image sensors 21 and 22. In FIG. 1(a), the processor 70 is shown by alternating long and short lines below the image sensor mens 20.

In the embodiment shown in the figure, correlation value calculation means 30 and reliability test means 50 are installed as software in the processor 70.

By forming the correlation value calculation means 30 as a hardware separate from the processor 70 by using an integrated circuit chip, such as a gate array, a plurality of pairs of image sensors 21 and 22 can be incorporated in the image sensor means 20 to allow a plurality of pairs of the image sensors to be operated simultaneously in order to calculate a correlation value for each pair of the image sensors in parallel.

In the embodiment shown in the figure, the correlation value calculation means 30 installed in the processor 70 is accompanied by a visual field designating means 31. In response to designating data SD, the visual field designating means 31 extracts from the image data D1 and D2 window part data WD1 and WD2, corresponding to the direction and size of the visual field S in which the target 1 is to be captured. In the figure, the visual field direction is indicated by the angle θ, and the size is denoted by a field of view angle φ, with corresponding window part data WD1 and WD2 indicated by the hatch-marked portion of the image data D1 and D2.

The procedure through which the correlation value calculation means 30 calculates a correlation value from the window part data WD1 and WD2 is described with reference to FIG. 1(b).

Groups of divisions d1 and d2 are extracted from the window part data WD1 and WD2 in such a way that the divisions of each group are offset from one another in order to provide a plurality of combinations Ck (k=0 to ke) as shown in the figure. Each of the window part data WD1 and WD2 is assumed to have (m) sensor data, and each division of the groups d1 and d2 is assumed to have (n) sensor data.

(n) is preferably set to be one-half to two-thirds of (m). It is preferable that the division d1 in the combination C0 is extracted from the right end of the window part data WD1, while the division d2 is extracted from the left end of the window part data WD2. The subsequent extraction positions are preferably shifted by one sensor data relative to the preceding extraction position.

Next, the correlation value calculation means 30 examines the correlation between the divisions d1 and d2 in each combination $C_k$ and calculates a correlation value. As the correlation value, it is preferable to use, for example the sum of absolute values of the differences in the corresponding sensor data in the divisions d1 and d2. In this case, the correlation value decreases with rising correlation between the divisions d1 and d2. The results of this calculation are stored in a memory 72 as a correlation value $V_k$ for each combination number (k).

The reliability test means 50 receives a plurality of correlation values $V_k$ and determines as a reliability indicator of the best correlation the precision of the best correlation point based on the changes in correlation value $V_k$ near a shift value, which is a number of a combination of the divisions corresponding to the best correlation. The precision as an indicator of the reliability is preferably the average of the slopes of a plurality of, e.g. two, correlation values before and after the best correlation point, or the gentler slope on both sides of the best correlation point. This is described with reference to FIG. 1(c).

The horizontal axis of FIG. 1(c) indicates a number (k) of a combination of the divisions in each group, and the correlation value $V_k$ generally varies with the variable (k) in a complex fashion. However, in order to avoid complication, the figure only shows the changes in correlation value $V_k$ near the best correlation point. In the example given in the figure, the correlation value is calculated as the sum of the absolute values of the differences between the corresponding sensor data in the divisions, so that the value of a variable (k) when the correlation value $V_k$ is the smallest is the best correlation point (s) in the figure. In the example shown in the figure, the precision as an indicator of the reliability is the average of a positive-side slope $\phi^+$ and a negative-side slope $\phi^-$ determined from the two correlation values $V_k$ before and after the best correlation point (s), or if the slopes on both sides of the best correlation point (s) are significantly different, the gentler slope of the two is used so that precision can appear lower. In the latter case, a correction should be made to allow the average to be closer to the value of the gentler slope.

However, precision determined in this manner is likely to increase with increasing of contrast of the images in the visual field S. An effective precision that has been corrected by using the contrast values can be used as an indicator of reliability. It is convenient that the contrast value is the sum of absolute values of the differential values for a data number in the window part data WD1 and WD2, and the average of the effective precision obtained from each pair of the window part data should be used more accurately. The differential values of the window part data are useful for the calculation of the correlation value $V_k$. Empirically speaking, it is better to provide such differential data to the correlation value calculation means 30 to calculate the correlation value $V_k$ than using the window part data WD1 and WD2 as the basis.

The present method determines that the image of the target 1 has been successfully detected only when the precision or effective precision determined in the above manner exceeds a predetermined level. In this case, the target 1 has been detected within the visual field S corresponding to the window part data, because the precision has been obtained from the window part data WD1 and WD2 and because the angle θ indicating the direction of the visual field S and the view angle φ of the field S correspond to the positions from which the window part data WD1 and WD2 have been extracted from the image data D1 and D2 and the number of sensor data. In addition, as seen in FIG. 1(b), the best correlation point (s) is the value obtained by shifting the divisions d1 and d2 in such a way that the best correlation value can be obtained depending on parallax between the images within the visual field S captured by the image sensors 21 and 22. Thus, the indicator σ of the distance to the target 1 described in the section of the prior art is easily calculated from the shift value that is the best correlation point (s).

Next, a specific example of the operation of the correlation value calculation means 30 and reliability test means 50, both installed as software in the processor 70, is explained with reference to FIGS. 2(a) and 2(b). FIG. 2(a) is a flow chart showing an example of the operation of the correlation value calculation means 30, and FIG. 2(b) is a flow chart showing an example of the operation of the reliability test means 50. In the example of the correlation value calculation means 30 given in FIG. 2(a), the differential data for the window part data is used as the basis for calculating the correlation value $V_k$, the data number for the window part data D1 and division d1 is (i), and the data number for the window part data D2 and division d2 is (j). In addition, the corresponding sensor data are referred to as $D_i$ and $D_j$, respectively.

At a first step S31 of the correlation value calculation means 30, the internal data numbers (i) and (j) of the window part data WD1 and WD2 are initialized to 1. At a subsequent step S32, differential data $S_i$ and $S_j$ for the window part data are calculated as differences between $D_{i+1}$ and $D_i$ and between $D_{j+1}$ and $D_j$, and at a step S33, when (m) data is present in the window part data, data number (i) is compared to m−1. If (i) is smaller than m−1, the data numbers (i) and (j) are incremented by one at a step S34, and the procedure returns to the step S32. Once all calculations for differential data are done, the procedure exits this operational loop at the step S33. Since the calculations for the differential data $S_i$ and $S_j$ are done, the value of (m) is replaced by m−1 at the step S35, and the procedure then proceeds to a step S36 in preparation for subsequent steps.

At a step 36, the final value ke is set for number (k) of the combination of the divisions d1 and d2. Number ke may be equal to 2(m−n), wherein (n) indicates the number of data in each division. The combination number (k) that is a variable is initialized to zero.

Next, at a step S36, starting data numbers (is) and (js) are set for the divisions d1 and d2 in case the combination number (k) is zero. As seen in FIG. 1(b), it may be is=m−n+1 and js=1. Then, a value Vm sufficiently large relative to the best correlation value vs is set, and a switch flag SF for switching the operation is set to 1. In the operation, it then calculates the correlation value for the combination number (k), and at a step S37, a correlation value variable V is set to 0, the data number variables (i) and (j) of the divisions d1 and d2 are initialized to (is) and (js), respectively, and a final value (ie) of the data number variable (i) for the division d1 is set. The final value (ie) may equal to is+n−1.

A subsequent step S38 calculates the correlation values, wherein the absolute value of the difference between the differential data $S_i$ and $S_j$ for the divisions d1 and d2 is added to the correlation value variable V. If it is determined at a subsequent step S39 that the variable (i) has not reached the final value (ie), variables (i) and (j) are each incremented by one at a step S40, and the procedure returns to the step S38. By the time the variable (i) finally reaches the final value (ie) to thereby shift the operation from the step S39 to a step S41, the correlation value V for the divisions d1 and d2 regarding the combination number (k) has been calculated and is stored in the memory 72 as the k-th correlation value $V_k$. At a step S42, the correlation value $V_k$ is compared to the best correlation value $V_s$, and if $V_k$ is larger, it is directly stored. Otherwise, at a step S43, the current value of the variable (k) is stored as the shift value (s) corresponding to the best correlation value, and then, the operation proceeds to a step S44.

At the step S44, the variable (k) of the combination number is compared to its final value ke to see (k) is smaller than ke. Since the result of the determination is initially affirmative, the operation passes to a step S45 to determine whether the switch flag SF is positive. Since the flag SF was set to 1 at the step S36, the result is initially affirmative, and at the step S46, the starting data number (is) in the division d1 is increased by one to shift the division d1 leftward by one data as shown in FIG. 1(b). At a subsequent step S48, the sign of the switch flag SF is switched and the variable (k) of the combination number is increased. The procedure then reverts to the step S37 and begins to calculate the correlation value $V_k$ for an updated variable (k). Once this calculation is done, the operation proceeds to the step S45. Since the switch flag SF has been set to a negative value, the result of the determination is negative, and at the step S47, the starting data number (js) of the division d2 is shifted rightward by being increased by one. The operation then passes to step S48.

At the subsequent steps, the same operation is repeated in which the correlation value $V_k$ is calculated while the combination number variable (k) is incremented. Once the variable (k) equals to the final value ke, the procedure exits from the loop at the step S44 to complete the correlation value calculation means 30. In this case, 2(m−n)+1 correlation values $V_k$ for the combinations $C_o$ to $C_{ke}$ in FIG. 1(b) are stored in the memory 72 of the processor 70 in FIG. 1(a), and the shift value (s) corresponding to the best correlation value shown in FIG. 1(c) is also stored therein. Although the operation of the correlation value calculation means 30 described above uses the differential data $S_i$ and $S_j$, the steps S31 to S35 may be omitted and the absolute value of the difference between $D_i$ and $D_j$, may be used to calculate the correlation value V at the step S38 if the sensor data $D_i$ and $D_j$, are used as they are.

An example of the operation of the reliability test means 50 in FIG. 2(b) is then described, wherein steps S51 to S54 determine the negative-side slope $\phi^-$ and the positive-side slope $\phi^+$ as an indicator of the precision of the best correlation, based on the plurality of correlation values $V_k$ and shift value (s) of the best correlation point read out from the memory 72, as described in FIG. 1(c). At the step S51, $\phi^-$ is calculated from $V_{s-2} - V_{s-1}$, and at the step S52, it is checked for positiveness. At the step S53, $\phi^+$ is calculated from $V_{s+2} - V_{s+1}$, and at the step S54, it is checked for positiveness. If they are positive at both steps S52 and S54, then in the example shown in the figure, an average slope $\phi_{av}$ between the negative-side slope $\phi^-$ and the positive-side slope $\phi^+$ is determined at a step S55.

At a subsequent step S56, the magnitudes of the negative-side slope $\phi^-$ and the positive-side slope $\phi^+$ are compared. If the negative-side slope $\phi^-$ is larger than the positive slope $\phi^+$, an average slope $\phi_{av}$ is multiplied by $\phi^+/\phi^-$ at a step S57. Otherwise, it is multiplied by $\phi^-/\phi^+$ at a step S58. In this manner, a correction is made, and if the slopes $\phi^-$ and $\phi^+$ are significantly asymmetric, the average slope $\phi_{av}$ is made closer to the gentler value of the two slopes, so that the resulting slope is used as an indicator of the precision.

In the given example, the slope φ is further corrected by the contrast of the images within the visual field S. Since the contrast is a range of brightness within a pattern of the images, at a subsequent step S59, the value of a contrast C is calculated as the average of the sum of the absolute values of the (m) differential data $S_i$ and $S_j$ corresponding to the window parts as shown by $\Sigma$ in the figure. In the illustrated embodiment, the slope $\phi$ is then divided by the value for the contrast C to obtain an effective slope $\phi_e$. The correction for the slope $\phi$ with the contrast C can be made by using various procedures.

At a step S60, it is determined whether the effective slope $\phi_e$ is larger than a specified limit level $\phi_L$. If so, the distance indicator $\sigma$ of the target 1 is calculated from the shift value (s) corresponding to the best correlation at a step S61. Since the indicator $\sigma$ is a simple linear function that depends on the number (m) of the data item in the window part data and the number (n) of the data item in the divisions at the shift value (s), it can be calculated very simply. If the result of the determination at the step S60, the step S52 or the step S54 is negative, the indicator $\sigma$ is set at a value $\sigma_f$ that clearly indicates that the detection of the target 1 has failed. At a step S63 subsequent to the steps S61 and S62, the indicator a of the distance is outputted to complete the reliability test means 50.

The results of the detection of the target 1 for which the reliability has been evaluated can be used to allow the visual field designating means 31 to specify a desired visual field S. For example, when the detection results obtained are not reliable, the visual field S in which the target 1 can correctly be captured can be determined from other detection results obtained by changing the direction or size of the visual field S. In this case, the effective slope $\sigma_e$ can effectively be used as a guide.

As described above, according to the invention, image sensor means receives images from the optical means to generate on a pair of image sensors a pair of image data representing a pattern of the images; the correlation value calculation means extracts groups of divisions from the window part data corresponding to the visual field in which the target in each of the image data is to be captured, while sequentially shifting the positions of the divisions; a correlation value for each combination of the divisions is calculated; the reliability test means calculates the precision of the best correlation as an indicator of the reliability based on the condition of changes in the correlation value near the best correlation point; it is determined that the target is present in the visual field only when the precision exceeds a preset level; and then, the distance to the target is calculated. This structure eliminates erroneous detection results caused by mixture of the images of other objects having different distances from the target to enable accurate calculation of the distance to the target, and the indicator of reliability can be used to set a visual field in which the target can be captured correctly.

As a measure of the reliability, this embodiment uses the average of the slopes of a plurality of the correlation values before and after the best correlation point. The advantage of such a method is that an accurate precision is easily calculated. In the embodiments of this invention, the gentler slope in one of both sides of the best correlation point is used and the average of both slopes is amended to be closer to the value of the gentler slope, so that it is possible to provide the precise evaluation criteria for reliability, and eliminate erroneous detection results.

In addition, the embodiment of this invention that makes a correction depending on the contrast values of the images within the visual field has a trait that it can use a measure more reasonable than that described above in order to evaluate the reliability of the detection results. The embodiment that uses the sum of the absolute values of the differential values for the window part data as the contrast values for correction enables more accurate contrast values to be obtained by using the simple calculations. Furthermore, the embodiment that utilizes the differential values used to calculate the contrast values as basic calculations of the correlation values often provides more accurate detection results than those obtained by using the original window part data to calculate the correlation values.

What is claimed is:

1. A distance detection method comprising:
    obtaining a pair of image data representing a pattern of images by using a pair of image sensors for receiving optical images via different optical paths;
    capturing a detection target extracted from each of the image data while sequentially shifting positions of divisions in respective groups of the divisions from window part data corresponding to a visual field to provide combinations, each comprising a pair of the divisions, and calculating, respectively, a correlation value between each pair of the divisions;
    selecting a best correlation value from the calculated correlation values to determine a best correlation point;
    obtaining a precision at the best correlation point as an indicator of reliability of the best correlation point, based on a changing condition of the correlation values on both sides of the best correlation value, said precision being obtained by an average of slopes of a plurality of the correlation values before and after the best correlation point; and
    detecting a distance to the detection target by determining that the detection target is present in the visual field seen through the window corresponding to the window part data only when the precision exceeds a predetermined level.

2. A distance detection method according to claim 1, wherein the precision as the indicator of the reliability of the best correlation is obtained by selecting a gentler slope in a plurality of the correlation values with slopes before and after the best correlation point.

3. A distance detection method according to claim 1, wherein the correlation value is calculated based on differential data for internal data in the window part data.

4. A distance detection method according to claim 1, further comprising specifying a direction and a width of an image capture visual field in connection with the correlation value, and selecting from the image data the window part data corresponding to the visual field to calculate the correlation value.

5. A distance detection method comprising:
    obtaining a pair of image data representing a pattern of images by using a pair of image sensors for receiving optical images via different optical paths;
    capturing a detection target extracted from each of the image data while sequentially shifting positions of divisions in respective groups of the divisions from window part data corresponding to a visual field to provide combinations, each comprising a pair of the divisions, and calculating, respectively, a correlation value between each pair of the divisions;
    selecting a best correlation value from the calculated correlation values to determine a best correlation point;
    obtaining a precision at the best correlation point as an indicator of reliability of the best correlation point, based on a changing condition of the correlation values on both sides of the best correlation value, said precision being changed based on an image contrast value in the window part in order to provide an effective precision, wherein as an indicator of the contrast value, sum of absolute values of differential values for internal data in the window part data is used; and detecting a distance to the detection target by determining that the detection target is present in the visual field seen through the window corresponding to the window part data only when the precision exceeds a predetermined level.

* * * * *